US012653236B2

(12) United States Patent
Hu et al.

(10) Patent No.: US 12,653,236 B2
(45) Date of Patent: Jun. 16, 2026

(54) HEATER AND CIGARETTE DEVICE WITH THE HEATER

(71) Applicant: SHENZHEN FIRST UNION TECHNOLOGY CO., LTD., Shenzhen City (CN)

(72) Inventors: Ruilong Hu, Shenzhen City (CN); Wei Chen, Shenzhen City (CN); Dongjun Yan, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 544 days.

(21) Appl. No.: 18/019,788

(22) PCT Filed: Aug. 3, 2021

(86) PCT No.: PCT/CN2021/110377
§ 371 (c)(1),
(2) Date: Feb. 3, 2023

(87) PCT Pub. No.: WO2022/028431
PCT Pub. Date: Feb. 10, 2022

(65) Prior Publication Data

US 2023/0284699 A1 Sep. 14, 2023

(30) Foreign Application Priority Data

Aug. 3, 2020 (CN) ........................ 202021576262.X

(51) Int. Cl.
*A24F 40/46* (2020.01)
*H05B 3/03* (2006.01)

(52) U.S. Cl.
CPC ............... *A24F 40/46* (2020.01); *H05B 3/03* (2013.01)

(58) Field of Classification Search
CPC ... A24F 40/20; A24F 40/46; H05B 2203/011; H05B 2203/013; H05B 2203/016;
(Continued)

(56) References Cited

U.S. PATENT DOCUMENTS

| | | | | |
|---|---|---|---|---|
| 5,060,671 A | 10/1991 | Counts et al. | | |
| 11,924,930 B2 * | 3/2024 | Wilke | ...................... | A24D 1/20 |
| 2001/0045424 A1 * | 11/2001 | Cooper | .................... | H05B 3/46 219/541 |

FOREIGN PATENT DOCUMENTS

| | | |
|---|---|---|
| CN | 109832674 A | 6/2019 |
| CN | 109846093 A | 6/2019 |

(Continued)

OTHER PUBLICATIONS

Translation provided by Clarivate Analytics, 11 pages (Year: 2022).*
English Translation of CN 109846093 (Year: 2019).*

*Primary Examiner* — Sang Y Paik
(74) *Attorney, Agent, or Firm* — Scully, Scott, Murphy & Presser, P.C.

(57) ABSTRACT

A heater includes: a base body; an infrared electrothermal coating, including a first infrared electrothermal coating and a second infrared electrothermal coating formed spaced apart on a surface of the base body; and a conductive element, including a first electrode, a second electrode, and a common electrode arranged spaced apart on the base body, where a conductive portion of the first electrode is electrically connected to the first infrared electrothermal coating, a conductive portion of the second electrode is electrically connected to the second infrared electrothermal coating, and a conductive portion of the common electrode is electrically connected to the first infrared electrothermal coating and the
(Continued)

second infrared electrothermal coating; and coupling portions of the first electrode, the second electrode, and the common electrode are all arranged adjacent to two ends of the base body to couple a power supply to feed an electric power to the infrared electrothermal coating.

20 Claims, 10 Drawing Sheets

(58) Field of Classification Search
CPC ........ H05B 2203/021; H05B 2203/032; H05B 3/03; H05B 3/04; H05B 3/06; H05B 3/46
USPC .......................................................... 219/553
See application file for complete search history.

(56) References Cited

FOREIGN PATENT DOCUMENTS

| | | | | |
|---|---|---|---|---|
| CN | 110384264 | A | 10/2019 | |
| CN | 209931486 | U | 1/2020 | |
| CN | 210782909 | U | 6/2020 | |
| KR | 10-2019-0030262 | A | 3/2019 | |
| WO | WO-2022166336 | A1 * | 8/2022 | ............. A24F 40/20 |

* cited by examiner

HEATER AND CIGARETTE DEVICE WITH THE HEATER

CROSS-REFERENCE TO RELATED APPLICATIONS

This application is a 35 U.S.C. § 371 National Phase conversion of International (PCT) Patent Application No. PCT/CN2021/110377, filed on Aug. 3, 2021, which claims priority to Chinese Patent Application No. 202021576262.X, filed with the China National Intellectual Property Administration on Aug. 3, 2020 and entitled "HEATER AND CIGARETTE DEVICE WITH THE HEATER", which is incorporated herein by reference in its entirety. The PCT International Patent Application was filed and published in Chinese.

TECHNICAL FIELD

This application relates to the field of cigarette device technologies, and in particular, to a heater and a cigarette device with the heater.

BACKGROUND

During the use of smoking articles such as cigarettes or cigars, tobacco is burned to produce smoke. Attempts have been made to replace these tobacco-burning articles with products that release compounds without burning. An example of such products is a heat-not-burn product that releases compounds by heating rather than burning tobacco.

Disclosed in Patent CN109846093A is a low-temperature baking cigarette device, including a first conductive module, a second conductive module, a third conductive module, and a fourth conductive module. A second ring portion in the second conductive module and a fourth ring portion in the fourth conductive module are arranged between two far-infrared coatings, that is, are located in the middle of a heating base body. During assembly with an annular electrode connector, the annular electrode connector needs to be sleeved over a first end or a second end of the heating base body and move toward the middle position. Since an inner diameter of the annular electrode connector is slightly larger than an outer diameter of the heating base body, the movement process is difficult, and the far-infrared coatings are prone to scratches or damage, resulting in low assembly efficiency.

SUMMARY

To solve the problems that assembly efficiency is low and far-infrared coatings are prone to scratches or damage in existing cigarette devices, embodiments of this application provide a heater and a cigarette device with the heater.

According to an aspect, an embodiment of this application provides a heater. The heater includes: a base body, provided with a surface, where the base body includes a first end and a second end opposite to each other, and the surface extends from the first end to the second end; an infrared electrothermal coating, including a first infrared electrothermal coating and a second infrared electrothermal coating formed spaced apart on the surface, where the first infrared electrothermal coating and the second infrared electrothermal coating are configured to independently receive an electric power of a power supply to generate heat and then generate infrared rays, so as to radially heat different parts of an aerosol-forming substrate; and a conductive element, including a first electrode, a second electrode, and a common electrode arranged spaced apart on the base body, where each of the first electrode, the second electrode, and the common electrode includes a coupling portion and a conductive portion, where the conductive portion of the first electrode is electrically connected to the first infrared electrothermal coating, the conductive portion of the second electrode is electrically connected to the second infrared electrothermal coating, and the conductive portion of the common electrode is electrically connected to the first infrared electrothermal coating and the second infrared electrothermal coating; and the coupling portion of the first electrode is arranged adjacent to the first end, the coupling portion of the second electrode is arranged adjacent to the second end, the coupling portion of the common electrode is arranged adjacent to the first end or the second end, and the coupling portion of the first electrode, the coupling portion of the second electrode, and the coupling portion of the common electrode are configured to couple the power supply to feed the electric power to the infrared electrothermal coating.

In a preferred embodiment, the surface includes a coating region, a first non-coating region arranged adjacent to the first end, and a second non-coating region arranged adjacent to the second end; and the coupling portion of the first electrode, the coupling portion of the second electrode, and the coupling portion of the common electrode are arranged in the first non-coating region and the second non-coating region, and the first infrared electrothermal coating and the second infrared electrothermal coating are arranged in the coating region.

In a preferred embodiment, the coupling portion of the first electrode is arranged in the first non-coating region, and the conductive portion of the first electrode extends from the coupling portion of the first electrode toward the second end; the coupling portion of the second electrode and the coupling portion of the common electrode are arranged in the second non-coating region; and the conductive portion of the second electrode extends from the coupling portion of the second electrode toward the first end, and the conductive portion of the common electrode extends from the coupling portion of the common electrode toward the first end.

In a preferred embodiment, the first infrared electrothermal coating and the second infrared electrothermal coating are arranged spaced apart in an axial direction of the base body.

In a preferred embodiment, an axial spacing distance between the first infrared electrothermal coating and the second infrared electrothermal coating is 0.4 mm to 1 mm, 0.4 mm to 0.8 mm, or 0.5 mm.

In a preferred embodiment, the conductive portion of the first electrode and the conductive portion of the second electrode are symmetrically arranged with the conductive portion of the common electrode along a central axis of the base body; and the coupling portion of the second electrode and the coupling portion of the common electrode are symmetrically arranged along the central axis of the base body.

In a preferred embodiment, the first infrared electrothermal coating and the second infrared electrothermal coating are arranged spaced apart in a circumferential direction of the base body.

In a preferred embodiment, each of the coupling portion of the first electrode, the coupling portion of the second electrode, and the coupling portion of the common electrode is separated from the first infrared electrothermal coating and the second infrared electrothermal coating.

According to another aspect, an embodiment of this application further provides a cigarette device. The cigarette device includes a housing assembly; a chamber, configured to receive an aerosol-forming substrate; and the heater described above, configured to heat the aerosol-forming substrate to generate an aerosol.

In a preferred embodiment, the cigarette device further includes an electrode connector and a base configured to maintain the electrode connector; and the electrode connector includes a contact portion, and at least a part of the contact portion protrudes toward the surface of the base body to contact a conductive element to form an electrical connection.

In a preferred embodiment, the contact portion includes a body and a cantilever formed in the body through hollowing, and the cantilever elastically contacts the conductive element to form the electrical connection.

In a preferred embodiment, a plurality of cantilevers are provided, and are distributed spaced apart in a circumferential direction of the base body.

In a preferred embodiment, the electrode connector further includes an extending portion; and the extending portion extends toward a position away from the base body relative to the contact portion, and the extending portion is configured to couple a power supply.

For the heater and the cigarette device with the heater provided in the embodiments of this application, the coupling portions of the first electrode, the second electrode, and the common electrode are arranged to be adjacent to two ends of the base body to avoid damaging the infrared electrothermal coating during assembly and improve assembly efficiency.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of this application, this application is described in further detail below with reference to the accompanying drawings and specific implementations.

Figure 1:
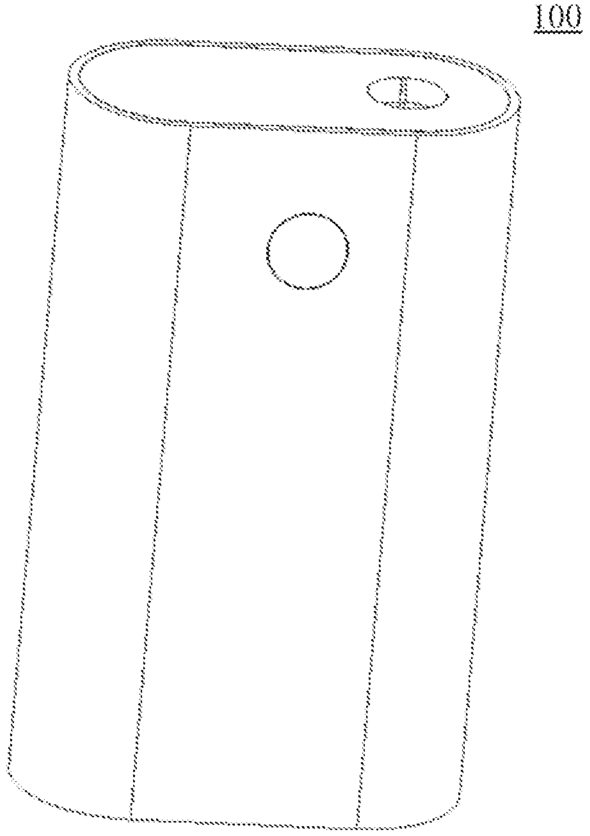
FIG. 1 is a schematic diagram of a cigarette device according to an implementation of this application.
Figure 2:
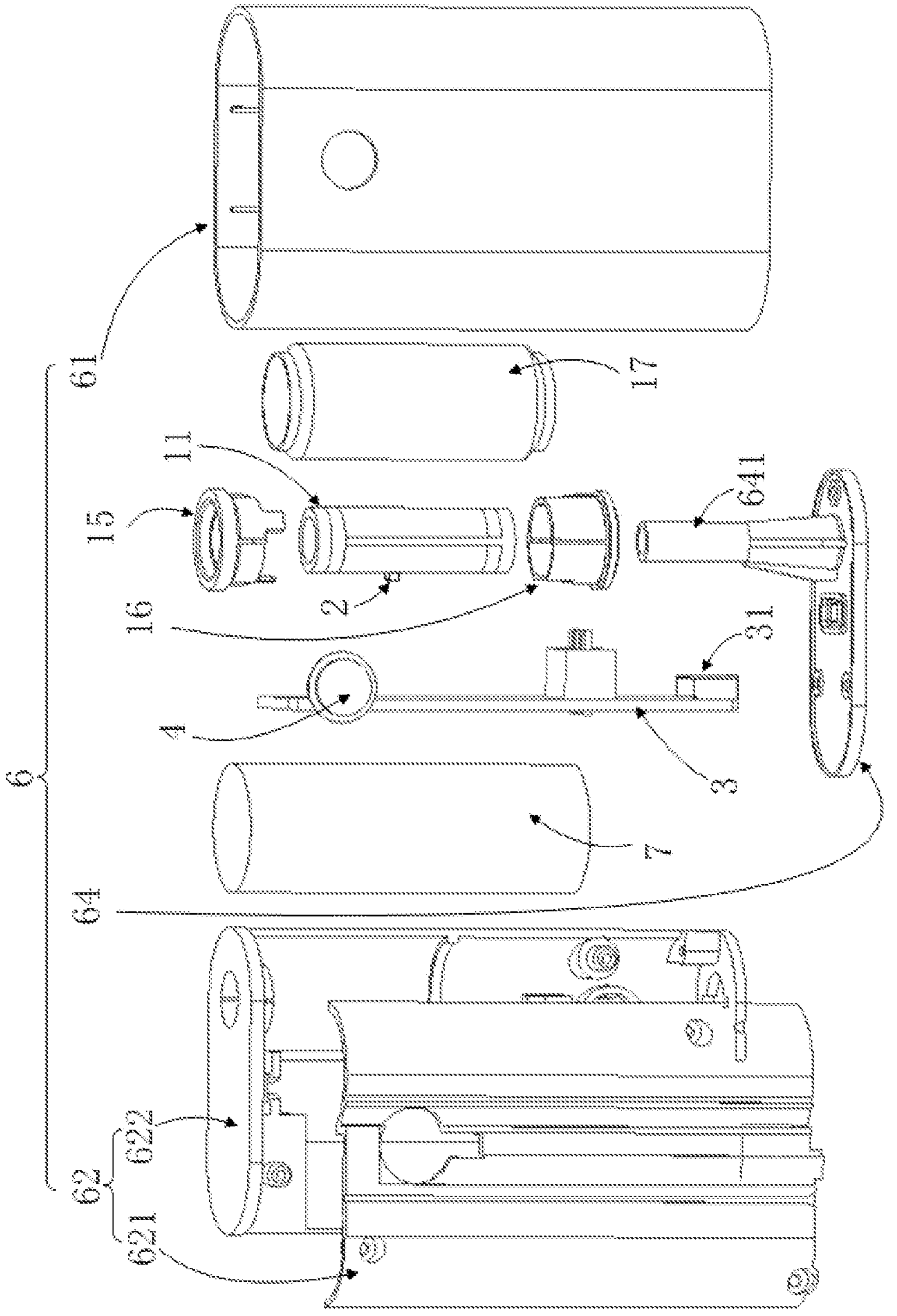
FIG. 2 is a schematic exploded view of a cigarette device according to an implementation of this application.

FIG. 1 and FIG. 2 show a cigarette device 100 provided by an implementation of this application, including a housing assembly 6 and a heater. The heater is arranged in the housing assembly 6. For the cigarette device 100 of this embodiment, an infrared electrothermal coating and a conductive element electrically connected to the infrared electrothermal coating are arranged on an outer surface of a base body 11. The infrared electrothermal coating can emit infrared rays to radiate and heat different parts of an aerosol-forming substrate in a chamber of the base body 11, thereby implementing the segmented heating of the aerosol-forming substrate.

The housing assembly 6 includes a shell 61, a fixing shell 62, a base, and a bottom cover 64. Both the fixing shell 62 and the base are fixed in the shell 61. The base is used to fix the base body 11. The base is arranged in the fixing shell 62. The bottom cover 64 is arranged at an end of the shell 61 and covers the shell 61.

Specifically, the base includes a base 15 sleeved at a first end A of the base body 11 and a base 16 sleeved at a second end B of the base body 11. Both the base 15 and the base 16 are arranged in the fixing shell 62. An air inlet tube 641 is arranged protruding on the bottom cover 64. An end of the base 16 facing away from the base 15 is connected to the air inlet tube 641. The base 15, the base body 11, the base 16, and the air inlet tube 641 are arranged coaxially. The base body 11 can be sealed with the base 15 and the base 16 through a sealing element. The base 16 and the air inlet tube 641 can also be sealed. The air inlet tube 641 is in communication with external air to facilitate smooth air intake during vaping of a user.

The cigarette device 100 further includes a main control circuit board 3 and a battery 7. The fixing shell 62 includes a front shell 621 and a rear shell 622. The front shell 621 is fixedly connected to the rear shell 622. The main control circuit board 3 and the battery 7 are both arranged in the fixing shell 62. The battery 7 is electrically connected to the main control circuit board 3. A key 4 is arranged protruding on the shell 61. The infrared electrothermal coating on a surface of the base body 11 may be powered on or off by pressing the key 4. The main control circuit board 3 is further connected to a charging interface 31. The charging interface 31 is exposed from the bottom cover 64. The user can charge or upgrade the cigarette device 100 through the charging interface 31 to ensure the continuous use of the cigarette device 100.

The cigarette device 100 further includes a heat insulation tube 17. The heat insulation tube 17 is arranged in the fixing shell 62. The heat insulation tube 17 is arranged on a periphery of the base body 11. The heat insulation tube 17 can prevent a large amount of heat from being transferred to the shell 61, causing the user to feel hot. The heat insulation tube includes a heat insulation material. The heat insulation material can be heat insulation glue, aerogel, aerogel felt, asbestos, aluminum silicate, calcium silicate, diatomite, and zirconia. The heat insulation tube may be a vacuum heat insulation tube. An infrared reflective coating may be further formed in the heat insulation tube 17 to reflect the infrared rays emitted by the infrared electrothermal coating on the base body 11 back to the infrared electrothermal coating, thereby improving heating efficiency.

The cigarette device 100 also includes a temperature sensor 2, such as an NTC temperature sensor, which is used to detect the real-time temperature of the base body 11 and transmit the detected real-time temperature to the main control circuit board 3. The main control circuit board 3 adjusts a current flowing through the infrared electrothermal coating according to the real-time temperature.

Specifically, when the NTC temperature sensor detects that the real-time temperature in the base body 11 is relatively low, for example, when the detected temperature inside the base body 11 is less than 150° C., the main control circuit board 3 controls the battery 7 to output a higher voltage to the conductive element, thereby increasing the current fed into the infrared electrothermal coating, increasing the heating power of the aerosol-forming substrate, and reducing a waiting time for the user to inhale the first puff.

When the NTC temperature sensor detects that the temperature of the base body 11 is 150° C. to 200° C., the main control circuit board 3 controls the battery 7 to output a normal voltage to the conductive element.

When the NTC temperature sensor detects that the temperature of the base body 11 is 200° C. to 250° C., the main control circuit board 3 controls the battery 7 to output a relatively low voltage to the conductive element.

When the NTC temperature sensor detects that the temperature inside the base body 11 is 250° C. or above, the main control circuit board 3 controls the battery 7 to stop outputting a voltage to the conductive element.

Figure 3:
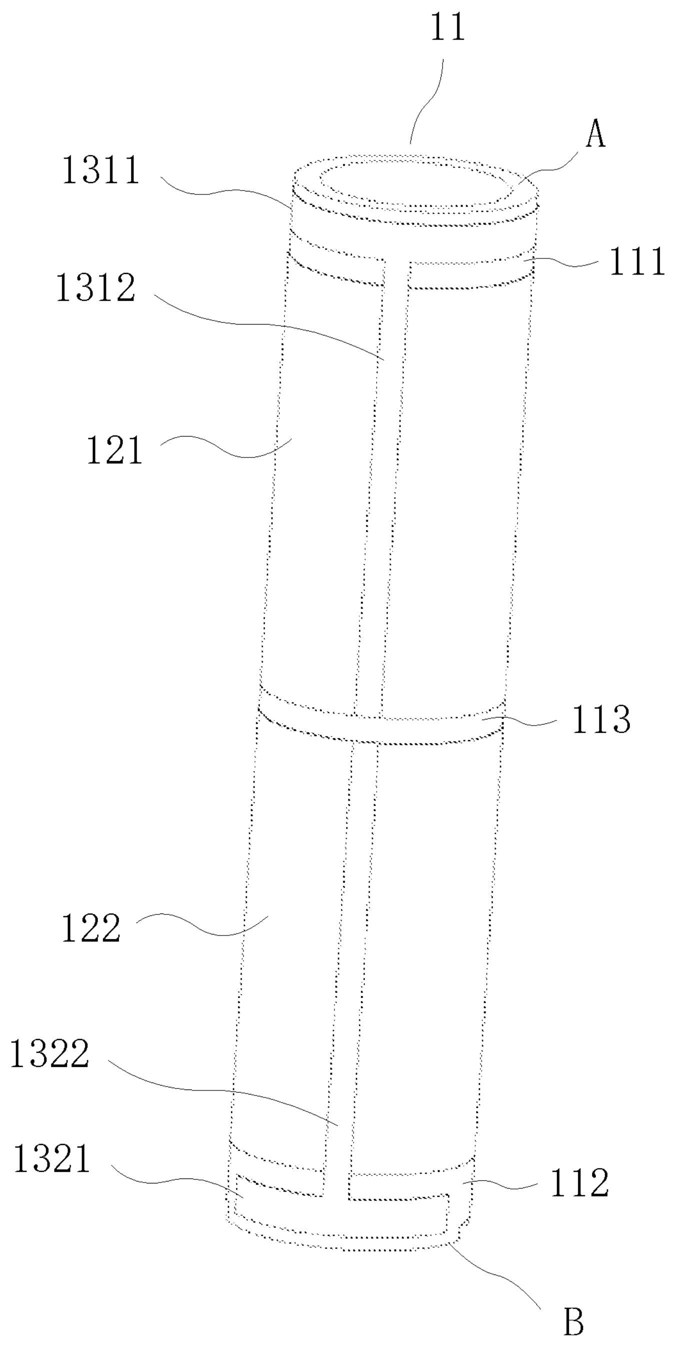
FIG. 3 is a schematic diagram of a heater according to an implementation of this application.
Figure 4:
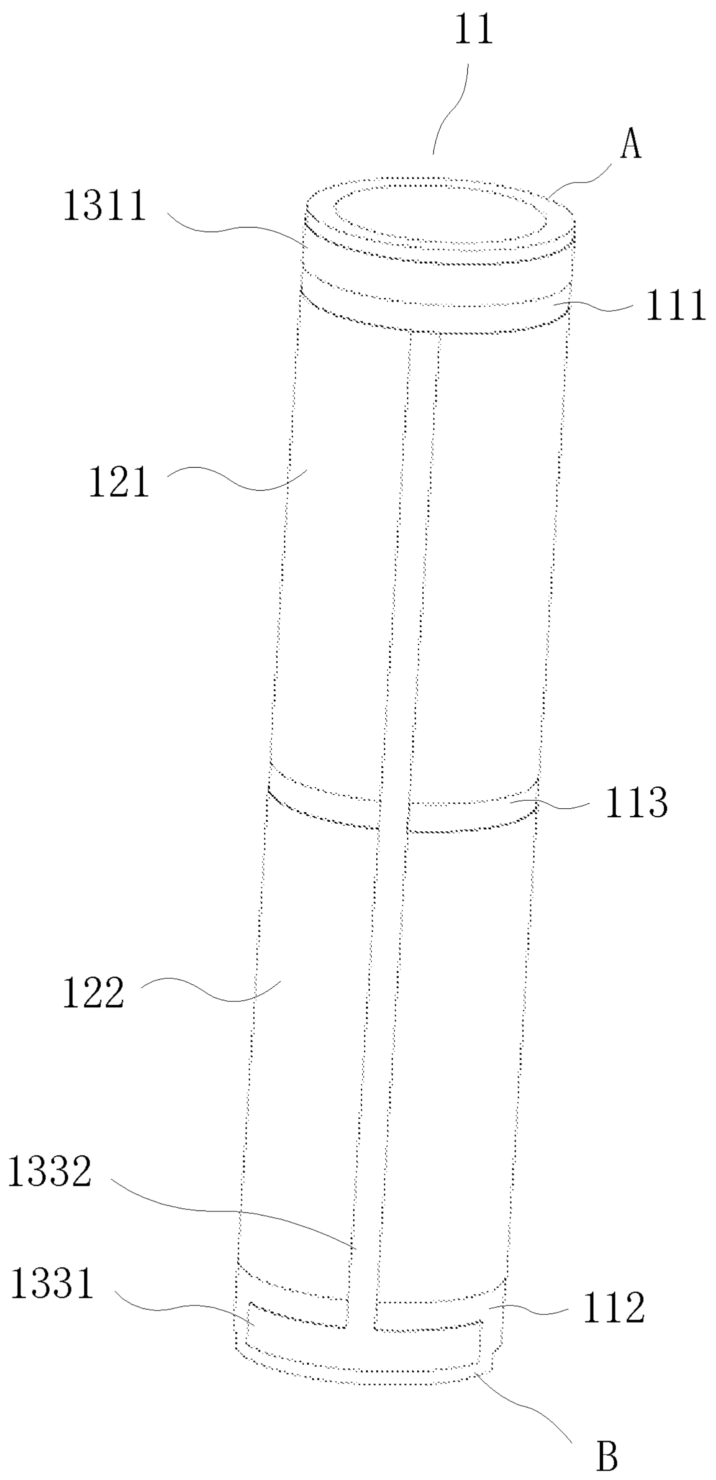
FIG. 4 is a schematic diagram of a heater from another perspective according to an implementation of this application.

FIG. 3 and FIG. 4 show a heater according to an implementation of this application. The heater includes:

a base body 11, provided with a chamber inside adapted to hold the aerosol-forming substrate.

Specifically, the base body 11 includes a first end (or near end) A and a second end (or far end) B, which extend on a surface between the first end A and the second end B. The base body 11 is hollow inside to form the chamber adapted to hold the aerosol-forming substrate. The base body 11 may have a cylindrical shape, a prismatic shape or another cylindrical shape. The base body 11 preferably has a cylindrical shape. The chamber is a cylindrical hole that runs through the middle of the base body 11. An inner diameter of the hole is slightly larger than an outer diameter of an aerosol-forming product, so that placing and heating the aerosol-forming product in the chamber is convenient.

The base body 11 may be made of a high temperature resistant and transparent material such as quartz glass, ceramics or mica, or another material with high infrared transmittance, such as: a high temperature resistant material with an infrared transmittance above 95%. This is not limited herein specifically.

The aerosol-forming substrate is a substrate that can release volatile compounds that can form an aerosol. The volatile compounds may be released by heating the aerosol-forming substrate. The aerosol-forming substrate may be a solid or a liquid or may include solid and liquid components. The aerosol-forming substrate may be carried on a carrier or a support through adsorption, coating, impregnation, or another manner. The aerosol-forming substrate may conveniently be a part of the aerosol-forming product.

The aerosol-forming substrate may include nicotine. The aerosol-forming substrate may include tobacco, for example, may include a tobacco-containing material including volatile tobacco-flavor compounds. The volatile tobacco-flavor compounds are released from the aerosol-forming substrate when the aerosol-forming substrate is heated. Preferably, the aerosol-forming substrate may include a homogeneous tobacco material such as leaf tobacco. The aerosol-forming substrate may include at least one aerosol-forming agent, and the aerosol-forming agent may be any appropriate known compound or a mixture of compounds. During use, the compound or the mixture of compounds facilitates and stabilizes formation of the aerosol and is substantially resistant to thermal degradation at an operating temperature of an aerosol-forming system. The appropriate aerosol-forming agent is well known in the related art and includes, but is not limited to: polyol, such as triethylene glycol, 1,3-butanediol, and glycerol; polyol ester, such as monoglyceride and diacetate or triacetate; and monobasic carboxylic acid, dibasic carboxylic acid, and polybasic carboxylic acid fatty acid ester, such as dimethyl dodecane dibasic ester and dimethyl tetradecane dibasic ester. Preferably, the aerosol-forming agent is polyhydric ester or a mixture thereof, such as triethylene glycol, 1,3-butanediol, or most preferably, glycerol.

The infrared electrothermal coating is formed on the surface of the base body 11. The infrared electrothermal coating may be formed on an outer surface of the base body 11, or may be formed on an inner surface of the base body 11.

In this example, the outer surface of the base body includes a coating region (a region where a first infrared electrothermal coating 121 and a second infrared electrothermal coating 122 are located), a first non-coating region 111, a second non-coating region 112, and a non-coating region 113. The first non-coating region 111 is arranged adjacent to the first end A of the base body 11. The second non-coating region 112 is arranged adjacent to the second end B of the base body 11. The non-coating region 113 is arranged between the first non-coating region 111 and the second non-coating region 112. Generally, lengths of the first non-coating region 111 and the second non-coating region 112 in an axial direction are 2 mm to 3 mm, and a length of the non-coating region 113 in the axial direction is approximately 0.4 mm to 1 mm, preferably 0.4 mm to 0.8 mm, and further preferably 0.5 mm.

The infrared electrothermal coating is formed on the coating region of the outer surface of the base body 11. Specifically, the infrared electrothermal coating includes a first infrared electrothermal coating 121 and a second infrared electrothermal coating 122 formed on the outer surface of the base body 11. The first infrared electrothermal coating 121 and the second infrared electrothermal coating 122 are distributed in the axial direction of the base body 11 and spaced apart by the non-coating region 113.

The infrared electrothermal coating receives an electric power to generate heat, and then generates infrared rays of certain wavelength, such as: 8 μm to 15 μm far-infrared rays. When a wavelength of the infrared rays matches an absorption wavelength of the aerosol-forming substrate, energy of the infrared rays is easily absorbed by the aerosol-forming substrate. The wavelength of the infrared rays is not limited and can be 0.75 μm to 1000 μm infrared rays, preferably 1.5 μm to 400 μm far-infrared rays. In this example, the first infrared electrothermal coating 121 and the second infrared electrothermal coating 122 are configured to independently receive an electric power of a power supply to generate heat and then generate infrared rays, so as to radially heat different parts of the aerosol-forming substrate.

The infrared electrothermal coating is preferably obtained by fully and uniformly stirring a far-infrared electrothermal ink, ceramic powder, and an inorganic binder, coating the mixture on the outer surface of the base body 11, and then performing drying and curing for a certain time. The thickness of the infrared electrothermal coating is 30 μm to 50 μm. Certainly, the infrared electrothermal coating may be obtained by mixing and stirring tin tetrachloride, tin oxide, antimony trichloride, titanium tetrachloride, and anhydrous copper sulfate in certain proportions and coating the mixture on the outer surface of the base body 11, or is one of a silicon carbide ceramic layer, a carbon fiber composite layer, a zirconium titanium oxide ceramic layer, a zirconium titanium nitride ceramic layer, a zirconium titanium boride ceramic layer, a zirconium titanium carbide ceramic layer, an iron oxide ceramic layer, an iron nitride ceramic layer, an iron boride ceramic layer, an iron carbide ceramic layer, a rare earth oxide ceramic layer, a rare earth nitride ceramic layer, a rare earth boride ceramic layer, a rare earth carbide ceramic layer, a nickel cobalt oxide ceramic layer, a nickel cobalt nitride ceramic layer, a nickel cobalt boride ceramic layer, a nickel cobalt carbide ceramic layer or a high silicon molecular sieve ceramic layer; and the infrared electrothermal coating may be an existing coating of another material.

The conductive element includes a first electrode, a second electrode, and a common electrode arranged spaced apart on the base body 11, and is configured to feed the electric power to the infrared electrothermal coating.

In this example, the first electrode and the second electrode are used as a positive electrode, and the common electrode is used as a negative electrode. After the first electrode is energized, a current can flow to the common electrode through the first infrared electrothermal coating 121. After the second electrode is energized, a current can flow to the common electrode through the second infrared electrothermal coating 122.

In this example, each of the first electrode, the second electrode, and the common electrode is a conductive coating. The conductive coating may be a metal coating, a conductive tape, or the like. The metal coating may be made of silver, gold, palladium, platinum, copper, nickel, molybdenum, tungsten, niobium or an alloy of the foregoing metal.

In this example, the first electrode includes a coupling portion 1311 and a conductive portion 1312 axially extending from the coupling portion 1311 toward the first second end B. The coupling portion 1311 extends in a circumferential direction of the base body 11 to form a ring electrode, and is arranged in the first non-coating region 111 on the outer surface of the base body 11. A part of the conductive portion 1312 is located in the coating region to form an electrical connection to the first infrared electrothermal coating 121. The coupling portion 1311 is spaced apart from the first infrared electrothermal coating 121. It should be noted that, in another example, the coupling portion 1311 may extend in the circumferential direction of the base body 11 to form an arc-shaped electrode.

The second electrode includes a coupling portion 1321 and a conductive portion 1322 axially extending from the coupling portion 1321 toward the first end A. The coupling portion 1321 extends in the circumferential direction of the base body 11 to form an arc-shaped electrode, and is arranged in the second non-coating region 112 on the outer surface of the base body 11. A part of the conductive portion 1322 is located in the coating region to form an electrical connection to the second infrared electrothermal coating 122. The coupling portion 1321 is spaced apart from the second infrared electrothermal coating 122.

The common electrode includes a coupling portion 1331 and a conductive portion 1332 axially extending from the coupling portion 1331 toward the first end A. The coupling portion 1331 extends in the circumferential direction of the base body 11 to form an arc-shaped electrode, and is arranged in the second non-coating region 112 on the outer surface of the base body 11. A part of the conductive portion 1332 is located in the coating region to form an electrical connection to both the first infrared electrothermal coating 121 and the second infrared electrothermal coating 122. The coupling portion 1331 is spaced apart from the second infrared electrothermal coating 122.

Both the conductive portion 1312 and the conductive portion 1322 are symmetrically arranged with the conductive portion 1332 along a central axis of the base body 11. The coupling portion 1321 and the coupling portion 1331 are symmetrically arranged along the central axis of the base body 11. With this arrangement, current flow paths of the first infrared electrothermal coating 121 and the second infrared electrothermal coating 122 can be uniformly distributed.

As can be seen from above, the coupling portion 1311 is arranged adjacent to the first end A of the base body 11, the coupling portion 1321 is arranged adjacent to the second end B of the base body 11, and the coupling portion 1331 is arranged adjacent to the second end B of the base body 11. In this way, during assembly with an electrode connector, it is not necessary to move from two ends to the middle position. That is, the infrared electrothermal coating is kept from scratches or damage, and assembly efficiency is improved.

In addition, it should be noted that, as mentioned in CN109846093A in the BACKGROUND, since a second ring portion and a fourth ring portion need to be arranged at the middle position of the heating base body and both the second ring portion and the fourth ring portion need to be separated from the far-infrared coatings, in a longitudinal direction of the heating base body, a length of a region between a first long strip portion and the second ring portion, a length of a region between a third long strip portion and the fourth ring portion, and a length in the axial direction of the second ring portion are relatively large. That is, the two far-infrared coatings are separated far at the middle position (approximately 2.5 mm). As a result, the aerosol-forming substrate corresponding to this region tends to be less heated, and effective heating cannot be performed to generate the aerosol. For the heater provided in this example, it is not necessary to arrange an electrode between the first infrared electrothermal coating 121 and the second infrared electrothermal coating 122, and a distance between the two is relatively small (the length of the non-coating region 113 in the axial direction is approximately 0.4 mm to 1 mm). Therefore, the problem that the aerosol-forming substrate is heated inadequately can be avoided, and the aerosol-forming substrate can be heated vertically more evenly, to maintain consistency during vaping.

Figure 5:
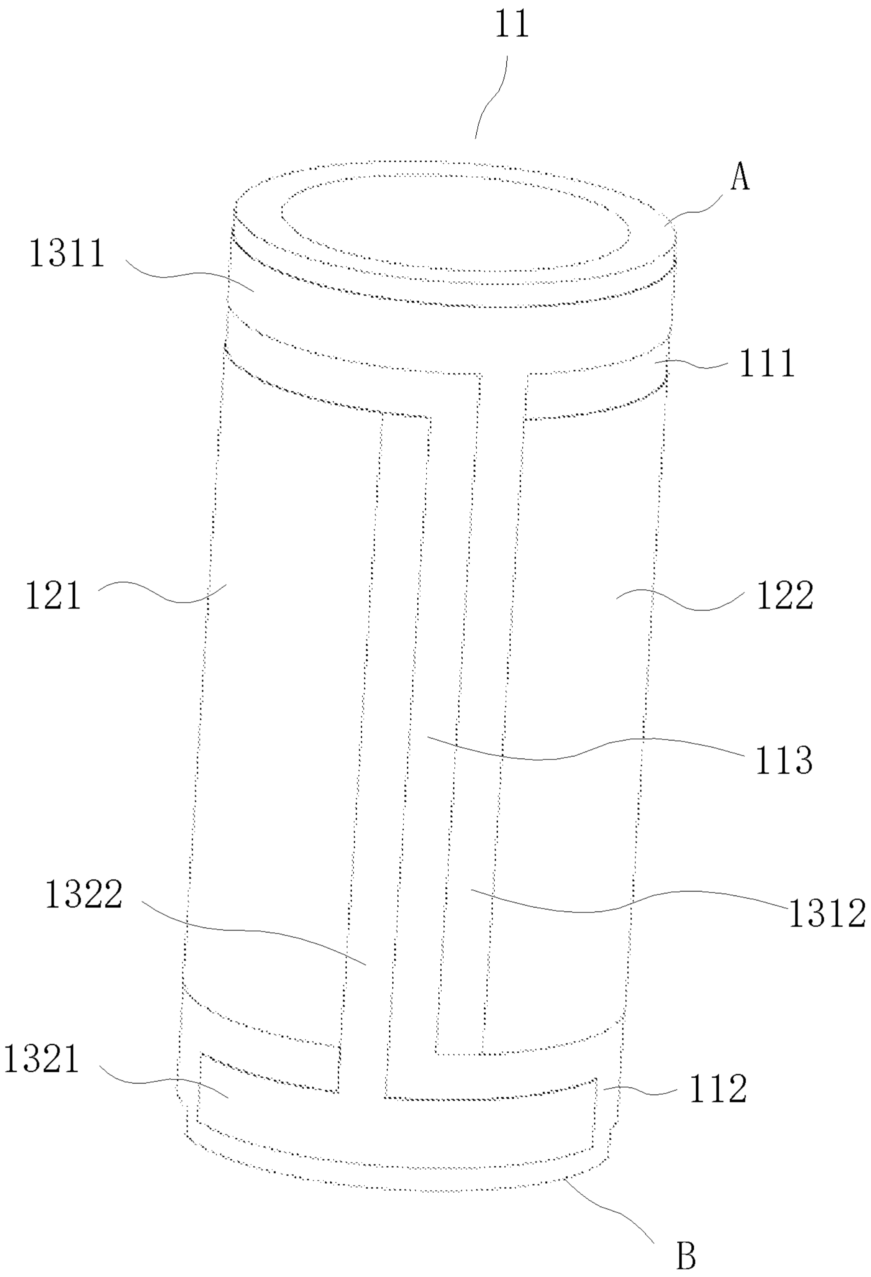
FIG. 5 is a schematic diagram of another heater according to an implementation of this application.
Figure 6:
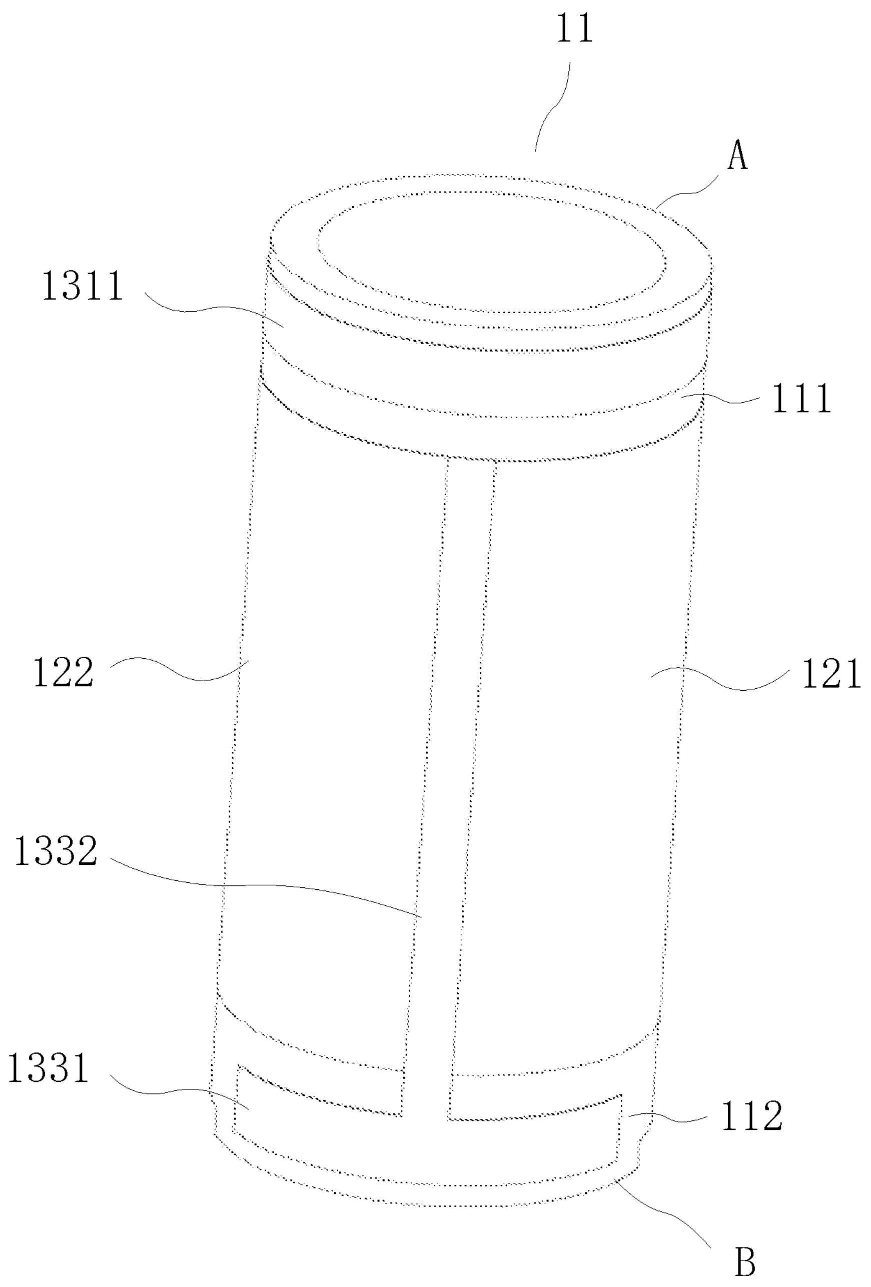
FIG. 6 is a schematic diagram of another heater from another perspective according to an implementation of this application.
Figure 7:
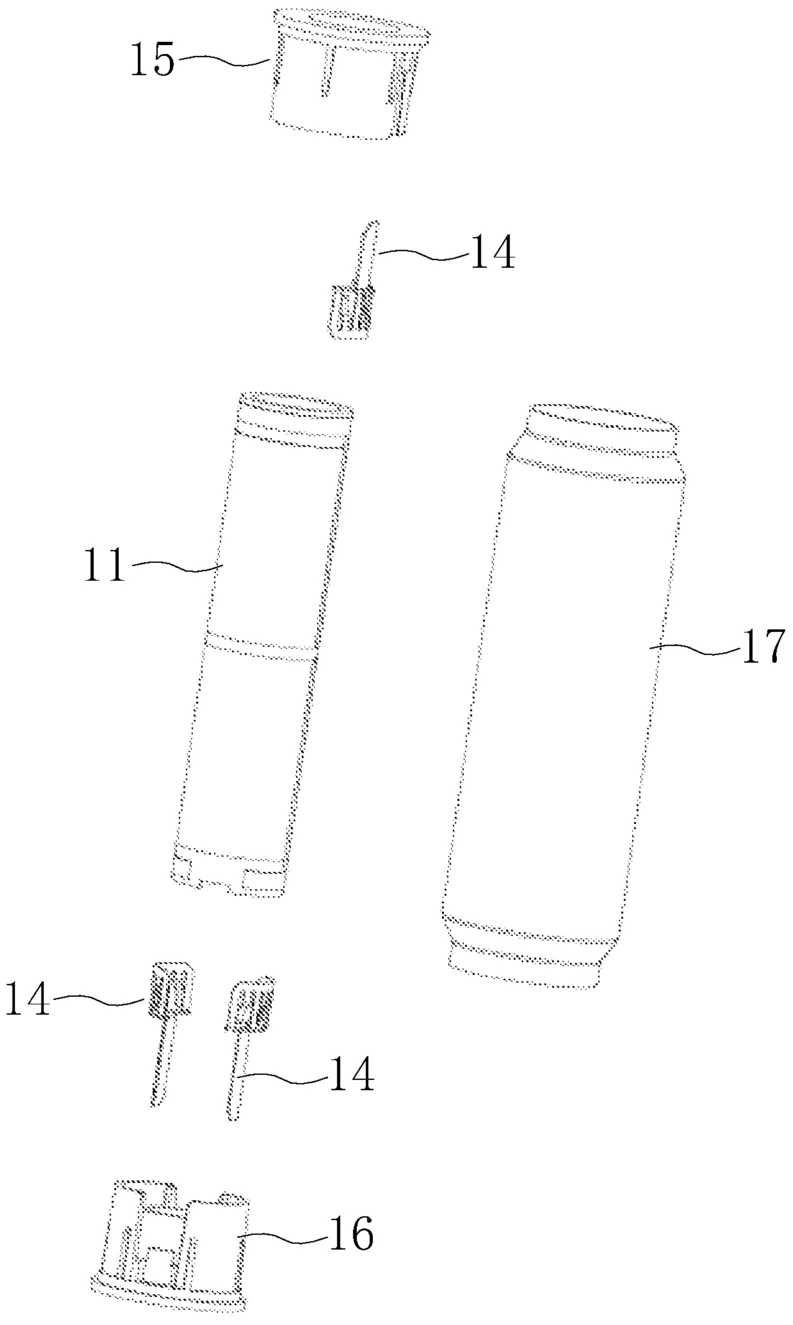
FIG. 7 is a schematic exploded view of some components of a cigarette device according to an implementation of this application.
Figure 8:
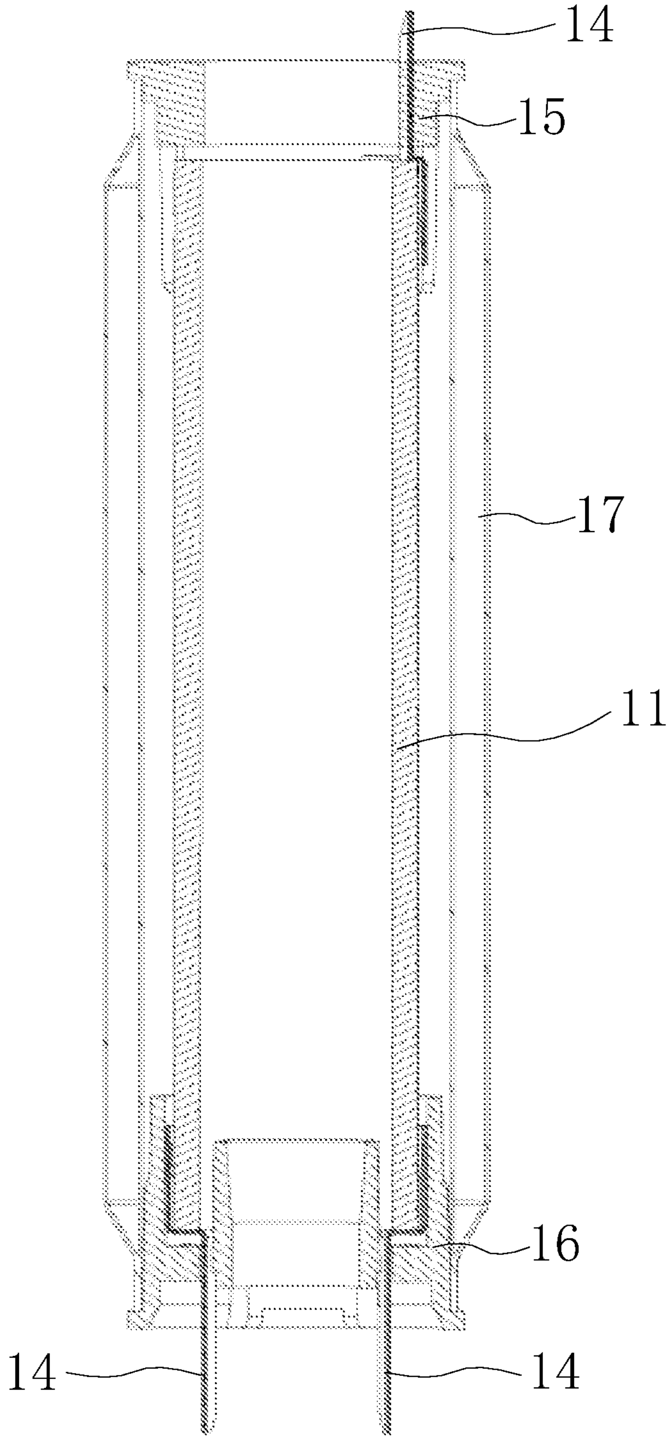
FIG. 8 is a schematic cross-sectional view of some components of a cigarette device according to an implementation of this application.
Figure 9:
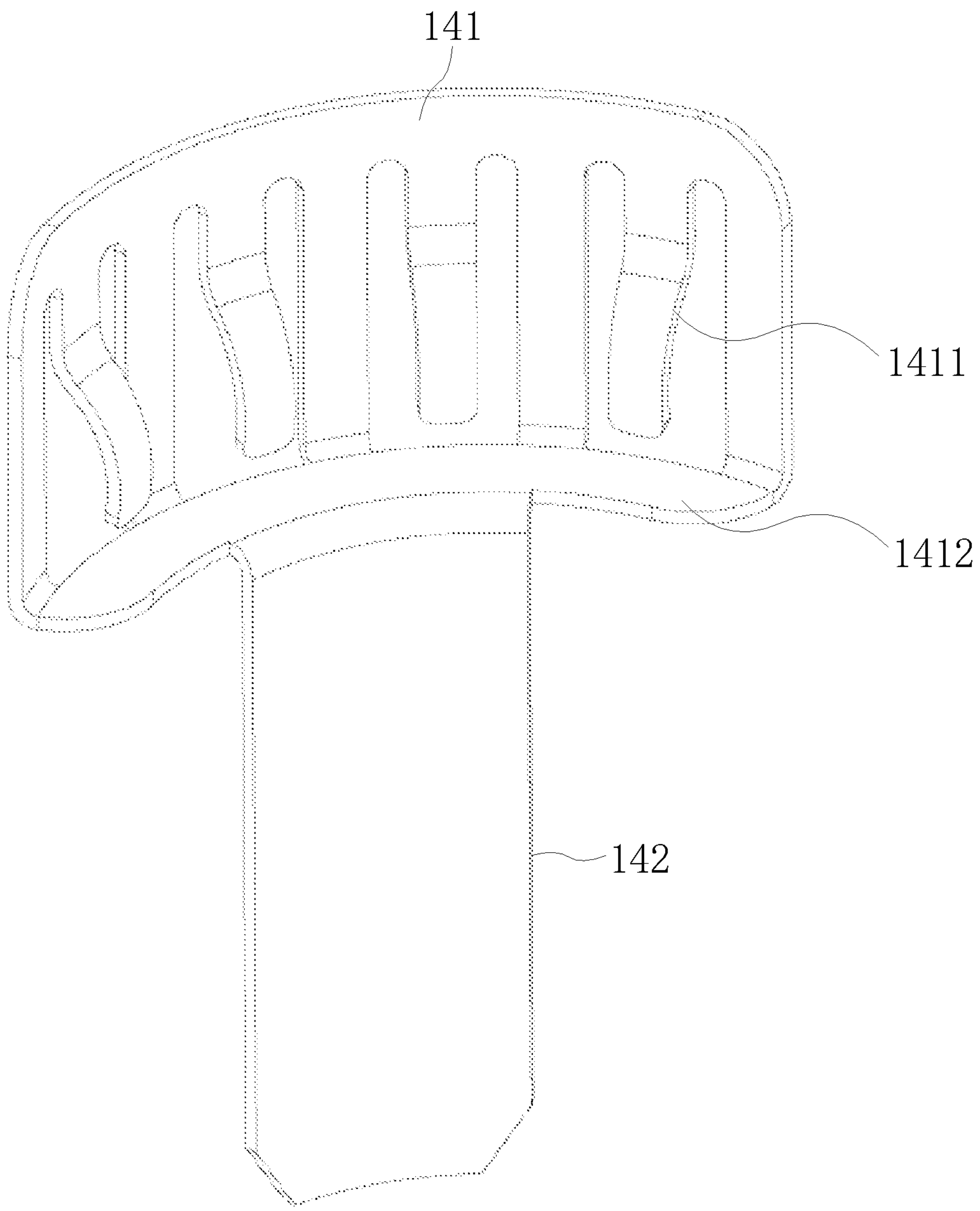
FIG. 9 is a schematic diagram of an electrode connector according to an implementation of this application.
Figure 10:
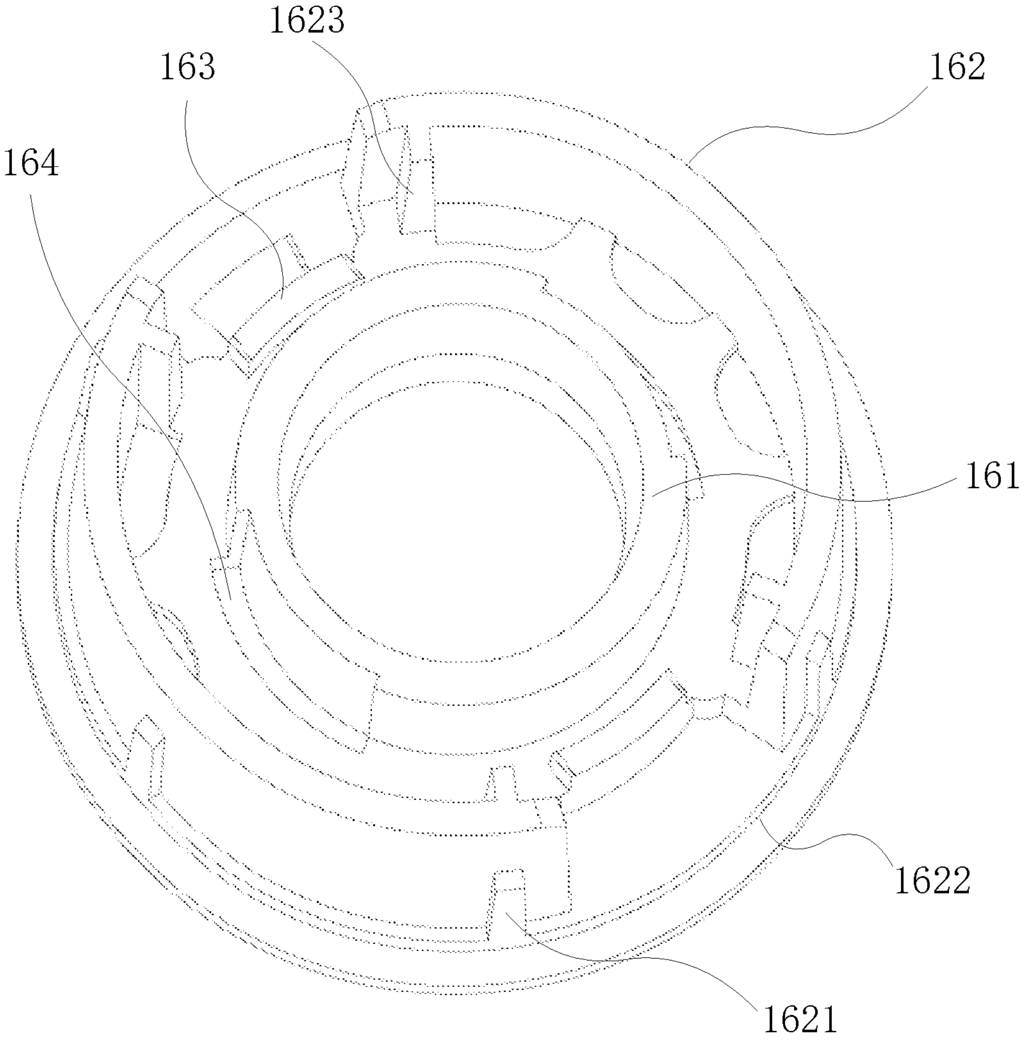
FIG. 10 is a schematic diagram of a base according to an implementation of this application.

FIG. 5 and FIG. 6 show another heater provided in an implementation of this application. Different from FIG. 3 and FIG. 4, the first infrared electrothermal coating 121 and the second infrared electrothermal coating 122 are distributed in the circumferential direction of the base body 11 and spaced apart by the non-coating region 113. All of the coupling portion 1311, the coupling portion 1321, and the coupling portion 1331 are also arranged adjacent to the first end A and the second end B of the base body 11, and do not need to be moved from two ends to the middle position during assembly with the electrode connector, so that the infrared electrothermal coating is kept from scratches or damage, and assembly efficiency is improved.

As can be understood with reference to FIG. 3, FIG. 4, and FIG. 7 to FIG. 10, the cigarette device 100 further includes an electrode connector 14. The electrode connector 14 is electrically connected to the first electrode, the second electrode, and the common electrode respectively, and extends the first electrode, the second electrode, and the common electrode to a position far away from the base body 11.

The electrode connector 14 electrically connected to the second electrode is used as an example for description.

The electrode connector 14 includes a contact portion and an extending portion 142. At least a part of the contact portion protrudes toward the outer surface of the base body 11 to contact the coupling portion 1321 to form an electrical connection. The extending portion 142 extends toward a position away from the base body 11 relative to the contact portion, and the extending portion 142 is configured to couple a power supply.

The contact portion includes a body 141 and four cantilevers 1411 formed on the body 141 through hollowing. When the four cantilevers 1411 abut against the coupling portion 1321, an elastic force can be generated to implement the electrical connection to the coupling portion 1321. The extending portion 142 extends from the body 141 toward a position away from the base body 11.

The shape of the body 141 matches that of an end portion of the base body 11. Specifically, the body 141 is in an arc shape, and the body 141 is provided with an abutting portion 1412 extending in a radial direction. The arc-shaped body 141 is closely attached to a surface of the end portion of the base body 11. The abutting portion 1412 abuts against the end portion of the base body 11 for positioning, and is used to limit a relative position between the contact portion and the base body 11, to position the cantilever 1411 at the coupling portion 1321.

The four cantilevers 1411 are arranged spaced apart on the body 141 in the circumferential direction of the base body 11. In another example, a quantity of cantilevers 1411 is not limited, and more or fewer than four cantilevers may be provided. It can be understood that a plurality of cantilevers 1411 are helpful for a reliable electrical connection to the electrodes, but increase the processing cost. Those skilled in the art can choose as required.

The cigarette device 100 also includes a base 16 sleeved on the second end B. The base 16 is made of insulating, high temperature resistant, and heat insulation materials.

Specifically, the base 16 includes an inner cylinder 161 and an outer cylinder 162. The base body 11 is detachably sleeved between an outer wall of the inner cylinder 161 and an inner wall of the outer cylinder 162.

The inner cylinder 161 is a hollow tube, and the air flow flows through the inner cylinder 161 to the chamber of the base body 11. The length of the inner cylinder 161 in the axial direction is slightly larger than the length of the non-coating region 112 in the axial direction to avoid contact with the electrode connector 14 when the aerosol-forming product is inserted.

A plurality of circumferentially distributed bosses 1621 extending toward the heat insulation tube 17 are provided on an outer wall of the outer cylinder 162. A radially extending abutting portion 1622 is provided at the end portion of the outer cylinder 162. The bosses 1621 and the abutting portion 1622 are arranged to facilitate the assembly with the heat insulation tube 17, so that the end portion of the heat insulation tube 17 can abut against the abutting portion 1622, and at the same time, a certain gap is provided between an inner wall of the heat insulation tube 17 and the outer wall of the outer cylinder 162 to facilitate the inflow of cold air. A plurality of holding portions 1623 distributed spaced apart are further provided on the inner wall of the outer cylinder 162. The holding portions 1623 extend from the inner wall of the outer cylinder 162 toward the inner cylinder 161. When the base body 11 is sleeved on the base 16, the holding portion 1623 abuts against the outer surface of the base body 11 to hold the end portion of the base body 11.

A circumferential stop portion for preventing the rotation of the base body 11 is further provided on the base 16. The circumferential stop portion includes a positioning protrusion 163 protruding on a side of the base body 11 facing the base 16. A positioning notch matching and corresponding to the positioning protrusion 163 is opened in a tube wall of the base body 11. When the base body 11 is sleeved on the base 16, the positioning protrusion 163 matches a buckle corresponding to the positioning notch to prevent the base body 11 from rotating circumferentially relative to the base 16.

A through hole 164 for leading out the extending portion 142 of the electrode connector 14 is further provided in the base 16.

The cigarette device 100 further includes a base 15 sleeved on the first end A of the base body 11. For the material and structure of the base 15, reference may be made to the base 16 described above.

It should be noted that, the specification of this application and the accompanying drawings thereof illustrate exemplary embodiments of this application, but this application is not limited to the embodiments described in the specification. Further, a person of ordinary skill in the art may make improvements or variations according to the above descriptions, and such improvements and variations shall all fall within the protection scope of the appended claims of this application.

What is claimed is:

1. A heater, comprising:

a base body, provided with a surface, wherein the base body comprises a first end and a second end opposite to each other, and the surface extends from the first end to the second end;

an infrared electrothermal coating, comprising a first infrared electrothermal coating and a second infrared electrothermal coating formed spaced apart on the surface, wherein the first infrared electrothermal coating and the second infrared electrothermal coating are configured to independently receive an electric power of a power supply to generate heat and then generate infrared rays, so as to radially heat different parts of an aerosol-forming substrate; and a conductive element, comprising a first electrode, a second electrode, and a common electrode arranged spaced apart on the base body; wherein each of the first electrode, the second electrode, and the common electrode comprises a coupling portion and a conductive portion; wherein the conductive portion of the first electrode is electrically connected to the first infrared electrothermal coating, the conductive portion of the second electrode is electrically connected to the second infrared electrothermal coating, and the conductive portion of the common electrode is electrically connected to the first infrared electrothermal coating and the second infrared electrothermal coating; and the coupling portion of the first electrode is disposed next to the first end, the coupling portion of the second electrode is disposed next to the second end, the coupling portion of the common electrode is disposed next to a selective one of the first end and the second end, and the coupling portion of the first electrode, the coupling portion of the second electrode, and the coupling portion of the common electrode are configured to couple the power supply to feed the electric power to the infrared electrothermal coating.

2. The heater according to claim 1, wherein the surface comprises a coating region, a first non-coating region disposed next to the first end, and a second non-coating region disposed next to the second end, the coating region is disposed between the first and second non-coating regions; and the coupling portion of the first electrode is disposed in the first non-coating region, the coupling portion of the second electrode is disposed in the second non-coating region, and the coupling portion of the common electrode is disposed in a selective one of the first non-coating region and the second non-coating region, and the first infrared electrothermal coating and the second infrared electrothermal coating are both disposed in the coating region.

3. The heater according to claim 2, wherein the conductive portion of the first electrode extends from the coupling portion of the first electrode toward the second end;

the coupling portion of the second electrode and the coupling portion of the common electrode are arranged in the second non-coating region; and the conductive portion of the second electrode extends from the coupling portion of the second electrode toward the first end, and the conductive portion of the common electrode extends from the coupling portion of the common electrode toward the first end.

4. The heater according to claim 2, wherein the first infrared electrothermal coating and the second infrared electrothermal coating are spaced apart from each other along an axial direction of the base body.

5. The heater according to claim 4, wherein an axial spacing distance between the first infrared electrothermal coating and the second infrared electrothermal coating is 0.4 mm to 1 mm, 0.4 mm to 0.8 mm, or 0.5 mm.

6. The heater according to claim 5, wherein the conductive portion of the first electrode and the conductive portion of the second electrode are symmetrically arranged with the conductive portion of the common electrode along a central axis of the base body; and the coupling portion of the second electrode and the coupling portion of the common electrode are symmetrically arranged along the central axis of the base body.

7. The heater according to claim 2, wherein the first infrared electrothermal coating and the second infrared electrothermal coating are spaced apart from each other along a circumferential direction of the base body.

8. The heater according to claim 1, wherein each of the coupling portion of the first electrode, the coupling portion of the second electrode, and the coupling portion of the common electrode is separated from the first infrared electrothermal coating and the second infrared electrothermal coating.

9. A cigarette device, wherein the cigarette device comprises:

a housing assembly;

a chamber, configured to receive an aerosol-forming substrate; and the heater according to claim 1, configured to heat the aerosol-forming substrate to generate an aerosol.

10. The cigarette device according to claim 9, wherein the cigarette device further comprises an electrode connector and a base configured to maintain the electrode connector; and the electrode connector comprises a contact portion, and at least a part of the contact portion protrudes toward the surface of the base body to contact a conductive element to form an electrical connection.

11. The cigarette device according to claim 10, wherein the contact portion comprises a body and a cantilever formed in the body through hollowing, and the cantilever elastically contacts the conductive element to form the electrical connection.

12. The cigarette device according to claim 11, wherein a plurality of cantilevers are provided, and are distributed spaced apart in a circumferential direction of the base body.

13. The cigarette device according to claim 10, wherein the electrode connector further comprises an extending portion; and the extending portion extends toward a position away from the base body relative to the contact portion, and the extending portion is configured to couple a power supply.

14. The heater according to claim 3, wherein the first infrared electrothermal coating and the second infrared electrothermal coating are spaced apart from each other along an axial direction of the base body.

15. The heater according to claim 14, wherein an axial spacing distance between the first infrared electrothermal coating and the second infrared electrothermal coating is 0.4 mm to 1 mm, 0.4 mm to 0.8 mm, or 0.5 mm.

16. The heater according to claim 15, wherein the conductive portion of the first electrode and the conductive portion of the second electrode are symmetrically arranged with the conductive portion of the common electrode along a central axis of the base body; and the coupling portion of the second electrode and the coupling portion of the common electrode are symmetrically arranged along the central axis of the base body.

17. The heater according to claim 3, wherein the first infrared electrothermal coating and the second infrared electrothermal coating are spaced apart from each other along a circumferential direction of the base body.

18. The cigarette device according to claim 11, wherein the electrode connector further comprises an extending portion; and the extending portion extends toward a position away from the base body relative to the contact portion, and the extending portion is configured to couple a power supply.

19. The cigarette device according to claim 12, wherein the electrode connector further comprises an extending portion; and the extending portion extends toward a position away from the base body relative to the contact portion, and the extending portion is configured to couple a power supply.

20. A heater, comprising:

a base body, provided with a surface, wherein the base body comprises a first end and a second end opposite to each other, and the surface extends from the first end to the second end;

an infrared electrothermal coating, comprising a first infrared electrothermal coating and a second infrared electrothermal coating formed spaced apart on the surface, wherein the first infrared electrothermal coating and the second infrared electrothermal coating are configured to independently receive an electric power of a power supply to generate heat and then generate infrared rays, so as to radially heat different parts of an aerosol-forming substrate; and a conductive element, comprising a first electrode, a second electrode, and a common electrode spaced apart on the base body; wherein each of the first electrode, the second electrode, and the common electrode comprises a coupling portion and a conductive portion; wherein the conductive portion of the first electrode is electrically connected to the first infrared electrothermal coating, the conductive portion of the second electrode is electrically connected to the second infrared electrothermal coating, and the conductive portion of the common electrode is electrically connected to the first infrared electrothermal coating and the second infrared electrothermal coating; and the coupling portion of the first electrode is disposed next to the first end, the coupling portion of the second electrode is disposed next to the second end, the coupling portion of the common electrode is disposed next to a selective one of the first end and the second end, and the coupling portion of the first electrode, the coupling portion of the second electrode, and the coupling portion of the common electrode are configured to couple the power supply to feed the electric power to the infrared electrothermal coating;

the first infrared electrothermal coating and the second infrared electrothermal coating are spaced apart from each other along a circumferential direction of the base body.

* * * * *